United States Patent
Shimoi et al.

[19]

[11] Patent Number: 6,039,879
[45] Date of Patent: Mar. 21, 2000

[54] METHOD FOR SEPARATING AND RECOVERING OBJECTIVE COMPONENT

[75] Inventors: Yoichi Shimoi; Hideo Tamura; Masaomi Okazaki; Takao Suganuma, all of Kanagawa, Japan

[73] Assignees: Nittetu Chemical Engineering Ltd.; Ajinomoto Co., Inc., both of Tokyo, Japan

[21] Appl. No.: 08/954,058

[22] Filed: Oct. 20, 1997

[30] Foreign Application Priority Data

Oct. 18, 1996 [JP] Japan .................................. 8-311147
Sep. 4, 1997 [JP] Japan .................................. 9-277881

[51] Int. Cl.$^7$ .................................................. B01D 61/00
[52] U.S. Cl. ........................ 210/641; 210/650; 210/651; 210/652; 210/195.2
[58] Field of Search ................................ 210/650, 641, 210/651, 652, 195.2

[56] References Cited

U.S. PATENT DOCUMENTS

| | | | |
|---|---|---|---|
| 4,336,328 | 6/1982 | Brown et al. ........................... | 430/569 |
| 4,523,999 | 6/1985 | Toyoshi et al. . | |
| 4,601,829 | 7/1986 | Kaneko et al. . | |
| 4,663,048 | 5/1987 | Tanaka et al. . | |
| 4,751,003 | 6/1988 | Raehse et al. ........................... | 210/651 |
| 4,865,744 | 9/1989 | Härtlung et al. ....................... | 210/651 |
| 4,936,999 | 6/1990 | Mattison et al. ....................... | 210/639 |
| 5,028,337 | 7/1991 | Linder et al. ........................... | 210/642 |
| 5,352,476 | 10/1994 | Brule et al. ............................. | 426/657 |
| 5,503,750 | 4/1996 | Russo, Jr. et al. ...................... | 210/651 |

FOREIGN PATENT DOCUMENTS 59-18088  4/1984  Japan .

*Primary Examiner*—Ana Fortuna
*Attorney, Agent, or Firm*—Oblon, Spivak, McClelland, Maier & Neustadt, P.C.

[57] ABSTRACT

A method for separating and recovering an objective component from a crude liquid by a membrane in a semi-batch system, including the steps of: at least two stages of adding a washing liquid to the crude liquid stored in a container and mixing the washing liquid with the crude liquid to form a mixture of the crude liquid and the washing liquid, wherein successive ones of the at least two stages are separated by a time lag, wherein the successive ones use washing liquids at different concentrations, in descending order, of the objective component concentration, and further wherein a last one of the plural stages uses only a washing liquid having essentially a zero concentration of the objective component; and for each of the plural stages, performing a step of membrane treatment of the mixture to transfer the objective component from the crude liquid to a permeated liquid.

10 Claims, 6 Drawing Sheets

METHOD FOR SEPARATING AND RECOVERING OBJECTIVE COMPONENT

BACKGROUND OF THE INVENTION

1. Field of the Invention

The present invention relates to a method for separating and recovering an objective component (valuable substance or impurity such as a salt), that is widely practiced in the fermentation industry, the pharmaceutical industry, the sugar manufacturing industry, the protein and amino acid industry, the food industry, the dye industry, the pigment industry, the chemical industry, and the like.

More specifically, it relates to a method for efficiently separating and recovering an objective component from a crude liquid containing the objective component through a combination of washing and membrane treatment.

2. Discussion of the Background

The fields of the fermentation industry, the protein and amino acid industry, and the pharmaceutical industry involve production of amino acids, brewing, production of antibiotics, and the like. For example, a product liquid containing a valuable substance, such as an amino acid, is separated from a fermentation broth by means of a separation membrane, a centrifugal separator or the like, and an objective component (valuable substance) is concentrated by evaporation using steaming or the like from the product liquid; on the other hand, microbial cells still remain as a separated residue.

In the fields of the dye industry, the pigment industry, the chemical industry and the like, salting out is carried out in the production process, followed by removal of a salt as an impurity.

Recovery of a valuable substance from the separated residue is often conducted by membrane treatment instead of conventionally adopted filtration. The membrane treatment is also used for removing the salt after salting out.

Taking the fermentation industry and the protein and amino acid industry, for instance, after a product liquid (valuable substance-containing liquid) is separated from the fermentation broth, the residue still containing the valuable substance together with concentrated microbial cells is treated with a separation membrane under pressure to pass the valuable substance across the membrane to the other side, i.e., a permeated liquid side. The permeated liquid is combined with the product liquid and further worked-up by, for example, evaporation to recover the product (valuable substance).

The term "valuable substance" as used herein means a useful substance to be recovered in the above-mentioned various industries, such as an amino acid that is separated from a fermentation liquid or the like, and includes not only a final product but an intermediate product therefor. In what follows, a liquid containing a valuable substance will be sometimes referred to as a product liquid.

Since a microbial cell suspension is usually concentrated to have an increased viscosity when it is separated from a product liquid (valuable substance-containing liquid), it is difficult to treat with a separation membrane as such. Therefore, it is a generally followed practice to add water to the concentrated cell suspension thereby to reduce the viscosity to a preferred level while giving consideration to the flux value ($l/m^2 \cdot hr$) of a finally recovered product liquid and also to diffuse and dilute the residual valuable substance throughout the liquid to facilitate the membrane treatment. Conventional apparatus used for recovering a valuable substance remaining in a concentrated cell suspension by membrane treatment include a batch system shown in FIG. 5(a) and a continuous system shown in FIG. 6(a).

In the batch system of FIG. 5(a), a given amount of a concentrated cell suspension (crude liquid 2) containing a valuable substance is fed to container 1 equipped with a stirring mechanism, and washing water 5 is supplied thereto continuously.

A part of the liquid in container 1 is introduced into membrane separation unit 4 by means of pump 3, where a product liquid is recovered and separated through the membrane as a permeated liquid 6 (recovered product liquid) while the unrecovered liquid 7 is returned to container 1. Because the liquid level in container 1 is lowered as the recovered product liquid is separated, it is monitored with a liquid level indicator (not shown), and container 1 is replenished with washing water 5 so as to maintain the liquid level constant. Thus, most of the valuable substance in the concentrated cell suspension diffuses into the liquid and passes into the permeated liquid side through the membrane separation unit.

In the system of FIG. 5(a), while the crude liquid is fed batchwise, the washing water 5 is fed continuously. At the end of the process, the microbial cells are removed from container 1 at exit 8. Accordingly, in a strict sense, this system is not included under the category of a batch system, but a semi-batch system.

To use a plurality of membrane separation units in series to recover a valuable substance from liquid has been long known as disclosed in JP-B-59-18088 (the term "JP-B" as used herein means an "examined Japanese patent publication").

FIG. 6(a) shows an example of such a multi-stage continuous system, in which sets each stage, comprising container 1 equipped with a stirring mechanism, pump 3 for discharging part of the liquid of container 1 and returning the rest of the liquid to container 1, and membrane separation unit 4 are arranged in series, and the liquid is treated in multiple stages.

Compared with a semi-batch system when repeatedly used several times, the continuous system having the same stages has a lower recovery of a final product (valuable substance) and requires more washing water 5, resulting in a lower valuable substance concentration in the recovered product liquid 6. It follows that the recovered product liquid requires more energy for the working-up procedure, such as concentration, to obtain the final product (valuable substance). At the end of the process, the microbial cells are removed from the system at exit 8.

On the other hand, in the dye industry, the pigment industry, the chemical industry and the like, salting out is carried out in the production step. After salting out, the salt as an impurity is removed in the same manner, in theory, as for the above-described recovery of a valuable substance remaining in a concentrated cell suspension. That is, while washing water is added to a dye-containing crude liquid or the like to diffuse and dilute the salt into the liquid, the thus-obtained liquid is subjected to membrane treatment to remove the salt.

The difference from the recovery of a valuable substance remaining in a concentrated cell suspension is that the objective component to be transferred to the permeated liquid side is not a valuable substance but an impurity (e.g., a salt) which should be disposed in principle and that the residual liquid (concentrated liquid side) is a valuable substance 6 (e.g., dye) as illustrated in FIGS. 5(b) and 6(b), the system shown in FIG. 5(b) being similar to the system shown in FIG. 5(a) and the system shown in FIG. 6(b) being similar to the system shown in FIG. 6(a).

Accordingly, the membrane treatment for impurity removal can be carried out in a semi-batch system or a continuous system similarly to that for recovery of a valuable substance. However, the conventional systems, either a semi-batch system or a continuous system, involve use of a large quantity of washing water, which results in an increased amount of drainage and necessitates large-sized installation for drainage disposal. In addition, an appreciable amount of the valuable substance (e.g., dye) migrates to the permeated liquid side, leading to a product loss.

SUMMARY OF THE INVENTION

An object of the present invention is to provide a method for separating and recovering a valuable substance in a high concentration at an improved recovery from a crude liquid containing the valuable substance, such as a concentrated microbial cell suspension, which remains after separation of a product liquid (i.e., valuable substance-containing liquid) from a production system (e.g., fermentation broth).

Another object of the present invention is to provide a method for separating and recovering a valuable substance and improved removal of impurities, such as salts, in a dye-containing crude liquid or the like by salting out to reduce the amount of the impurities, such as salts, remaining in the valuable substance.

Furthermore, an object of the present invention is to provide an efficient and economical method for separating and recovering a valuable substance which makes it possible to reduce the requisite amount of a washing liquid, such as water, to reduce the drainage.

Moreover, an object of the present invention is to improve a recovery of a valuable substance thereby improving the economy and also to increase the concentration of a valuable substance in a recovered product liquid thereby reducing the energy required for subsequent working-up procedures for obtaining a final product, for example, the energy required for concentration by steaming to cause evaporation at. As for equipment, the present invention aims at carrying out the above-described separation operation by using a compact and convenient apparatus that does not need such a large space for installation as is required for a continuous system.

These and other objects of the present invention have been accomplished by a method for separating and recovering an objective component from a crude liquid by a membrane in a semi-batch system, comprising the steps of:

at least two stages of adding a washing liquid to the crude liquid stored in a container and mixing the washing liquid with the crude liquid to form a mixture of said crude liquid and said washing liquid,
  wherein successive ones of said at least two stages are separated by a time lag,
  wherein said successive ones use washing liquids at different concentrations, in descending order, of the objective component concentration, and further
  wherein a last one of said plural stages uses only a washing liquid having essentially a zero concentration of the objective component; and
for each of said plural stages, performing a step of membrane treatment of the mixture to transfer the objective component from the crude liquid to a permeated liquid.

Figure 1:
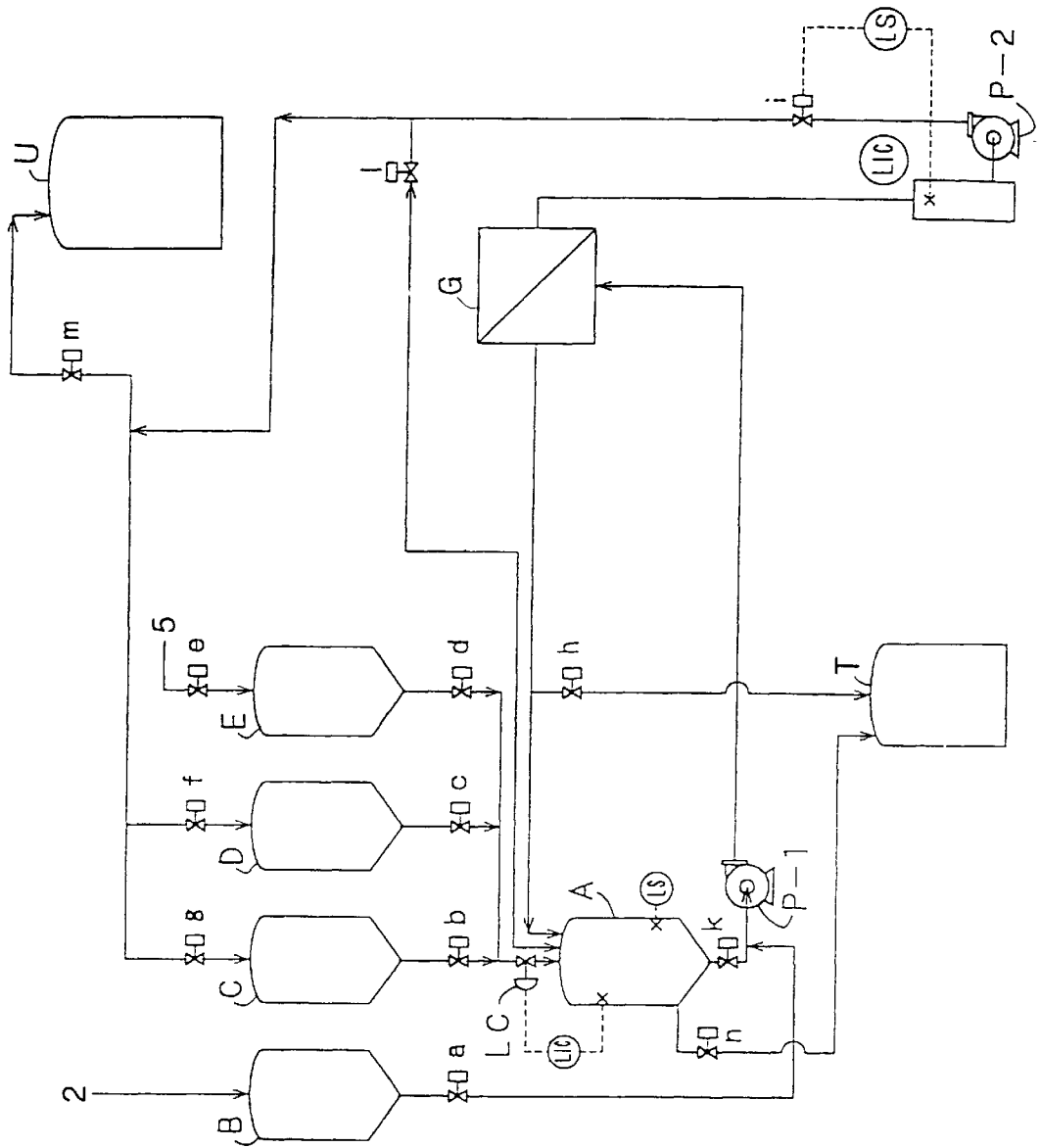
FIG. 1 schematically illustrates an example of the apparatus used in the present invention.

1, 1' and 1": Container;
2: Crude liquid;
3, 3' and 3": Pump;
4, 4' and 4": Membrane separation unit;
5: Washing liquid;
6: Recovered product liquid;
7: Unrecovered liquid;
8: Exit (microbial cells);
9: Exit (drainage);
A, B, C, D and E: Containers;
a, b, c, d, e, f, g, h, i, k, l, m, and n: Valves;
G: Membrane separation unit;
LC: Liquid level control valve;
LIC: Level indicator and controller;
LS: Level switch;
P-1 and P-2: Pumps;
T: Residue tank;
U: Recovered product tank;
X: Drainage tank; and
Y: Recovered product tank.

DESCRIPTION OF THE PREFERRED EMBODIMENTS

As a preferred embodiment, the present invention relates to the above method, further comprising the step of separating the crude liquid into the permeated liquid and a residual liquid, wherein the permeated liquid being obtained by a first stage membrane treatment of the at least two stages using a washing liquid having the highest objective component concentration is discharged out of the semi-batch system, the residual liquid being obtained by a final stage membrane treatment of the at least two stages using only the washing liquid having essentially a zero concentration of the objective component is kept in the semi-batch system, and the permeated liquid obtained by the membrane treatment of the at least two stages other than the first and final stages is utilized as a washing liquid.

The above-mentioned method of separation includes an embodiment in which the objective component to be separated from the crude liquid is a valuable substance, and the method further comprises the step of taking the valuable substance-containing permeated liquid out of the system, and an embodiment in which the crude liquid contains both the objective component and a valuable substance, the crude liquid subject to the method forms a residual liquid containing a high concentration of the valuable substance, and the method further comprises the step of separating the valuable substance-containing residual liquid.

Water is used frequently for washing various substances. In the present invention, too, water is preferably used as a washing liquid.

In order to accomplish the above objects, the present invention adopts a semi-batch system in which a crude liquid is fed batchwise while a washing liquid is fed continuously, taking a rate of separation of an objective component, i.e., recovery of a product (valuable substance) or a removal of an impurity (e.g., salt) into account, and an improvement to the washing step is added. Unlike the washing step in a conventional semi-batch system which is carried out by using a large quantity of a washing liquid such as water in the beginning of the washing step, the washing system adopted in the present invention is characterized in that a plurality of washing liquids different in concentration of an objective component to be separated are prepared and used in descending order of the concentration and, in the final stage of washing, a washing liquid free from the objective component, such as water, is used.

According to this manipulation, the requisite amount of the washing liquid such as water can be diminished, and the recovery of the product (valuable substance) or the removal of the salt and the like can be increased, which also leads to reduction of the amount of drainage.

As stated above, the practice of the present invention includes a case in which a valuable substance passes into the permeated liquid side and a case in which an impurity such as a salt passes into the permeated liquid side, leaving a valuable substance in the concentrated liquid side, i.e., the residual liquid side. Both cases can be accounted for based on the same principle.

Accordingly, the term "objective component" as used herein is intended to mean a substance that is to be transferred into the permeated liquid side through membrane separation irrespective of whether or not it is a desired component. Recovery of a valuable substance such as an amino acid from a fermentation broth comes under the former case. In this case, an amino acid or the like passes into the permeated liquid side so that the "objective component" in a crude liquid agrees with the valuable substance to be recovered. On the other hand, desalting of a dye-containing crude liquid is included under the latter case, that is, the salt is the "objective component" to be transferred into the permeated liquid side, while the dye remaining in the residual liquid is the valuable substance.

In describing the operations carried out in the invention, an embodiment of recovering an objective component, such as an amino acid, from a fermentation broth or the like will be explained by referring to the drawings.

FIG. 1 is an example of the apparatus for carrying out the invention, in which washing is effected in three stages.

In FIG. 1, container A is equipped with a stirring mechanism for a washing operation. To container A is supplied a crude liquid that is a concentrate left after a product liquid (valuable substance-containing liquid) has been recovered from a fermentation broth in a preceding step (not shown). A washing liquid is also supplied to container A and mixed with the crude liquid. The mixture is introduced into membrane separation unit G by means of pump P-1, where a product liquid to be recovered passed into the permeated liquid side. The residual liquid which is not allowed to pass through the separation membrane is returned to container A.

The crude liquid treated in this particular embodiment comprises microbial cells used in a fermentation process, a residual valuable substance (objective component), and water, and is usually in a slurried form having fluidity.

The practical procedures are explained below starting from an empty state of container A.

At the start, valves i, k, and 1 are open, with all the other valves closed. Pump P-1 is in principle operated continuously except when the membrane separation unit is stopped for cleaning or when any part of the apparatus gets into trouble. If pump P-1 is once stopped, the liquid increases its viscosity due to thixotropy, tending to cause difficulty in resuming pumping to the membrane separation unit.

While pump P-1 is in continuous operation, a very small amount of the liquid can be left in container A, or the system can be controlled so as to leave little liquid in container A.

The crude liquid 2 is stored in container B. Supply of the crude liquid 2 to container B may be either continuous or intermittent.

At first, with valve n open, valve k is slowly closed while slowly opening valve a with care not to cause damage by shock to the separation membrane of unit G. The crude liquid 2 stored in container B is thus fed by pump P-1 so that the liquid remaining in unit G and the liquid held up in the piping that is almost free of the objective component, containing a solid and water, may be pushed into container A.

By this operation, the liquid flows from container A and enters a residue tank T in an amount corresponding to the supply of the crude liquid whereby the held-up liquid is displaced by the crude liquid. This displacement is intended to prevent the crude liquid's being diluted with the held-up liquid that will reduce the effect of the present invention.

The displacement of the held-up liquid can be achieved by feeding the crude liquid 2 in an amount corresponding to the previously determined amount of the held-up liquid under liquid level control or timer control.

The crude liquid 2 is further fed to container A with valve k open and valve n close. When the liquid in container A reaches a prescribed volume, valve a is closed.

Then, valve 1 is closed, and valve m is opened. When the crude liquid 2 is to be preliminarily concentrated, the liquid is forwarded to membrane separation unit G with no addition of a washing liquid to transfer the objective component to the permeated liquid side. Preliminary concentration of the crude liquid is effective in reducing the required quantity of a washing liquid. Application of the preliminary concentration is decided taking the total efficiency into consideration.

Valve b is opened to start supply of a washing liquid having a medium concentration of the objective component, and the mixed liquid is sent to membrane separation unit G by pump P-1, where a product liquid containing the objective component at a high concentration is separated through the membrane and delivered to a recovered product tank U. On separating the product liquid, the liquid level of container A decreases, whereupon liquid level control valve LC operates to supply the medium concentration washing liquid from container C to container A in an amount corresponding to the amount of the liquid that has been passing through the membrane.

Thus, use of a washing liquid containing an objective component in a high concentration makes it feasible to increase the concentration of the objective component in the liquid having passed through a membrane separation unit thereby attaining a high recovery of the objective component (valuable substance in this case) even though the amount of a washing liquid such as water is reduced.

While container A used in this embodiment is equipped with a stirrer (not shown in FIG. 1), a stirring mechanism could be omitted only if sufficient mixing of a crude liquid and a washing liquid is secured by means of the pump. Or, as a matter of course, other stirring mechanisms may be employed.

When container C becomes empty, valves b and m are closed, and valves g and c are opened, and a washing liquid containing the objective component in a low concentration is fed from container D to container A. At the same time, the permeated liquid having the objective component in a medium concentration is delivered to container C and reserved for use as a medium concentration washing liquid.

When the volume of the permeated liquid reaches that of the low concentration washing liquid fed, and container D becomes empty, valves c and g are closed, and valves d and f are opened. In the final washing stage, washing water in container E is fed to container A. The permeated liquid having a low concentration of the objective component that has passed through membrane separation unit G is forwarded to container D and reserved for use as a low concentration washing liquid.

When container E becomes empty, valves d and f are closed. Valve e is opened, and container E is replenished with fresh washing water 5. The amount of washing water 5 to be supplied to container E is decided according to a prescribed volume ratio (R) of washing water 5, W ($m^3$), to crude liquid, V ($m^3$), R=W/V (hereinafter referred to as an "R value"). After the final washing stage, valve h is opened, and the residual liquid mainly comprising microbial cells is sent to the residue tank T. Valve h is closed when the liquid level in container A drops to the level of level switch LS provided in the lower part of container A so that container A may retain a slight amount of the liquid in order to prevent pump P-1 from drawing nothing. The R value as referred to above can be decided appropriately, taking into consideration the characteristics of the crude liquid, the physical properties of the objective component to be recovered or removed, the conditions of operations such as the treating time, and the specifications of the apparatus.

The membrane separation unit to be used is desirably one having such a structure so as to hardly cause a liquid hold-up in the permeated liquid side.

Instead of displacing the held-up liquid with a crude liquid as in the above-described embodiment, the held-up liquid can be once mixed with a crude liquid, and the mixture is preliminarily concentrated before adding a washing liquid. In this case, the permeated liquid may be returned to container C for use as a medium concentration washing liquid. If desired, the residual liquid may be concentrated prior to discharge in order to increase the recovery.

A cycle of treatment completes at the time when container A becomes nearly empty, and the cycle is repeated.

As described above, the present invention is characterized in that washing liquids containing an objective component to be separated at different concentrations are fed successively with a time lag in descending order of the concentration and that the permeated liquid separated in the course of multi-stage washing is taken advantage of for the next cycle of washing. In the present invention such an operation is expressed in the term "time-lagged multi-stage washing operation". While in the foregoing description the permeated liquid having passed through the membrane separation unit G is directly returned to a container for reuse, it may be once kept in a reservoir before it is transferred to the washing liquid container for the sake of convenience for system design or for subsequent steps. The concentration of the liquid can be adjusted while in the reservoir.

In the embodiment according to FIG. 1 the multi-stage washing operation comprises three stages using a washing liquid having a medium concentration (container C), a washing liquid having a low concentration (container D), and water as a washing liquid (container E). It is theoretically possible to reduce the washing liquid as the number of the washing stages increases. However, to increase the number of the stages is accompanied by difficulty in practice. Therefore, the liquid kept in the container can be provided with a concentration gradient to improve the efficiency instead of increasing the number of stages.

A concentration gradient can be given by, for example, (1) slowly supplying the washing liquid along the inner wall of the washing liquid container, (2) slowly supplying the washing liquid to the washing liquid container along a chain, (3) partitioning the washing liquid container with plates, or (4) making the washing liquid container vertically long.

As can be understood from the foregoing, the crude liquid which can be treated by the method of the present invention includes liquids left after separating a valuable objective component through various solid-liquid separation steps in the fermentation industry, the pharmaceutical industry, the sugar manufacturing industry, the protein and amino acid industry, the food industry or the like which still contain the objective component together with the separation residue; liquids having been subjected to salting out and containing a valuable substance together with a salt in the dye industry, the pigment industry, the chemical industry, and the like. The crude liquid applicable to the present invention will be easily understood by those skilled in the art from the foregoing description.

The membrane separation unit which can be used for separating and recovering an objective component from the crude liquid includes various known separation membranes, such as a microfiltration membrane, an ultrafiltration membrane, a loose RO membrane (nanofiltration membrane), and the like.

The washing liquid to be used is selected appropriately in accordance with the characteristics and physical properties of the objective component and the crude liquid. Various kinds of organic or inorganic solutions are employable as a washing liquid. Examples thereof include water, alcohols, acids, and alkali solutions. In many cases use of water is effective. If desired, the washing liquid can contain additives, such as a coagulant, a dispersant, a surfactant, a pH adjusting agent, a defoaming agent and the like as far as the valuable substance to be recovered is not adversely affected.

The method of the present invention improves the recovery of a valuable substance from a residue that is left after separating a product liquid (valuable substance-containing liquid), for example, a concentrated microbial cell suspension still containing a valuable substance which is left after separating a product liquid from a fermentation broth, thereby to provide a product liquid having a high valuable substance concentration. Similarly, the method improves the removal of an impurity, such as a salt that is contained in a dye-containing crude liquid after salting out, thereby to provide a product liquid having a reduced impurity concentration.

The method of the present invention is efficient and economical because the amount of washing liquid, such as water, can be saved, and the amount of drainage can be reduced.

The present invention is also effective in saving energy used in the subsequent purification step, such as steaming used for concentration, because of the high valuable substance concentration of the recovered liquid. Compared with a single-stage semi-batch system which is an improvement over the common continuous membrane treatment and has recently been spreading, the present invention makes it possible to reduce the cost of steaming by half.

Furthermore, the system of the present invention achieves a satisfactory valuable substance recovery as a whole thereby to reduce the organic matter in the waste liquid. This makes a contribution to reduction in burden of drainage disposal as is easily understandable for one skilled in the art.

The apparatus for carrying out the method of the present invention is more compact and convenient than a continuous system, needing less space for installation.

The present invention will now be illustrated by way of Examples, but it should be understood that the present invention is not limited thereto.

EXAMPLE 1

A microorganism capable of producing lysine, a kind of amino acid, was cultured to obtain a fermentation broth containing lysine. The fermentation broth was 5-fold concentrated by minuteness filtration membrane treatment to recover a clear lysine-containing solution (product liquid) as a filtrate. The 5-fold concentrate left after the membrane treatment and containing 6.8 g/dl of lysine was used as a crude liquid 2 of the present invention.

The crude liquid 2 (50 l) was treated to recover lysine by using the apparatus shown in FIG. 1 in which an ultrafiltration membrane (NTU-3250 produced by Nitto Denko Corporation; fraction molecular weight: 20,000) was used as a separation membrane. The objective component which was contained in the crude liquid 2 and to be separated was lysine, i.e., a valuable substance. Water was used as a washing liquid.

A 5 l portion of the crude liquid 2 (lysine concentration: 6.8 g/dl) reserved in container B was transferred to container A (7-liter volume). With pump P-1 and liquid level control valve LC operating, 1.33 times (R=1.33) as much water containing lysine at a medium concentration of 2.35 g/dl as 5 l of the crude liquid was slowly fed from container C to container A, and the mixture was introduced from container A into membrane separation unit G through pump P-1. The recovered product liquid having passed through the separation membrane into the permeated liquid side was sent to a recovered product liquid tank U. The recovered product liquid had an average lysine concentration of 4.81 g/dl.

The feed of the medium concentration washing liquid to container A was controlled by means of the liquid level control valve LC in such a manner that the amount being fed corresponded to the amount of the liquid passing through the membrane so that the volume of the liquid in container A might be kept constant (1st stage).

When the amount of the permeated liquid reached 6.65 l which corresponded to the amount of the fed medium concentration washing liquid, and container C became empty, the same amount (6.65 l) of a washing liquid having a low lysine concentration of 0.88 g/dl was slowly fed from container D to container A. The liquid having passed through membrane separation unit G had an average lysine concentration of 2.35 g/dl. The liquid was sent to container C for use as a medium concentration washing liquid in the subsequent washing cycle (2nd stage).

When the amount of the permeated liquid reached 6.65 l which corresponded to the amount of the fed low concentration washing liquid, and container D became empty, the same amount (6.65 l) of washing water for final washing was slowly fed from container E to container A. The liquid having passed through membrane separation unit G had an average lysine concentration of 0.88 g/dl. The liquid was sent to container D for use as a low concentration washing liquid in the next washing cycle (3rd stage).

After 6.65 l of water was fed, the residue comprising the microbial cells was forwarded to a residue tank T. The residue had a lysine concentration of 0.42 g/dl.

The feed of the washing liquid or washing water to container A was controlled so as to correspond to the amount of the liquid passing through the membrane separation unit so that the amount of the liquid in container A was maintained constant throughout the above stages by means of a liquid level controller.

The above washing cycle was repeated 10 times for each batch, and 50 l of the crude liquid was treated under the condition R=1.33. As a result, the recovery of lysine as a valuable substance from the crude liquid was 93.8%.

The total amount of fresh water used in each 3rd stage of 10 cycles was 66.5 l. The low concentration washing liquid and fresh water increased its lysine concentration as they pass through the membrane and were reused as a medium concentration washing liquid and a low concentration washing liquid, respectively.

The same crude liquid was treated in the same manner as described above, except for varying the R value (washing water/crude liquid volume ratio). The results obtained are plotted with hollow lozenge marks (◇) in FIG. 3, in which the abscissa indicates R=washing water/crude liquid, and the ordinate the percentage of lysine recovery (%).

COMPARATIVE EXAMPLE 1

Figure 5A:
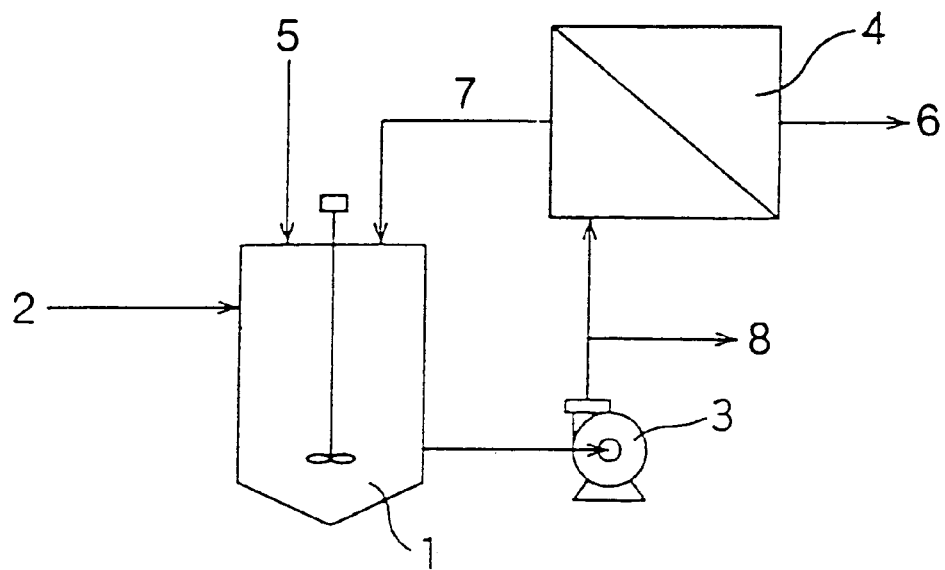
FIGS. 5(a) and 5(b) schematically illustrates a conventional semi-batch system.

For comparison, 50 l of the same crude liquid as used in Example 1 was treated in a single-stage semi-batch system by using the apparatus shown in FIG. 5(a). The same ultrafiltration membrane as used in Example 1 was used as a separation membrane.

The crude liquid 2 (50 l; lysine concentration: 6.8 g/dl) was put in container 1 and treated under the condition of R=2. More specifically, twice as much washing water as the crude liquid (i.e., 100 l) was slowly fed to container 1 to recover a lysine-containing solution having a lysine concentration of 2.94 g/dl. The residue comprising the microbial cells had a lysine concentration of 0.92 g/dl, and the recovery of lysine from the crude liquid was 86.4%.

The same crude liquid was treated in the same manner, except for varying the R value (washing water/crude liquid volume ratio). The results obtained are plotted with hollow square marks (□) in FIG. 3.

Figure 6A:
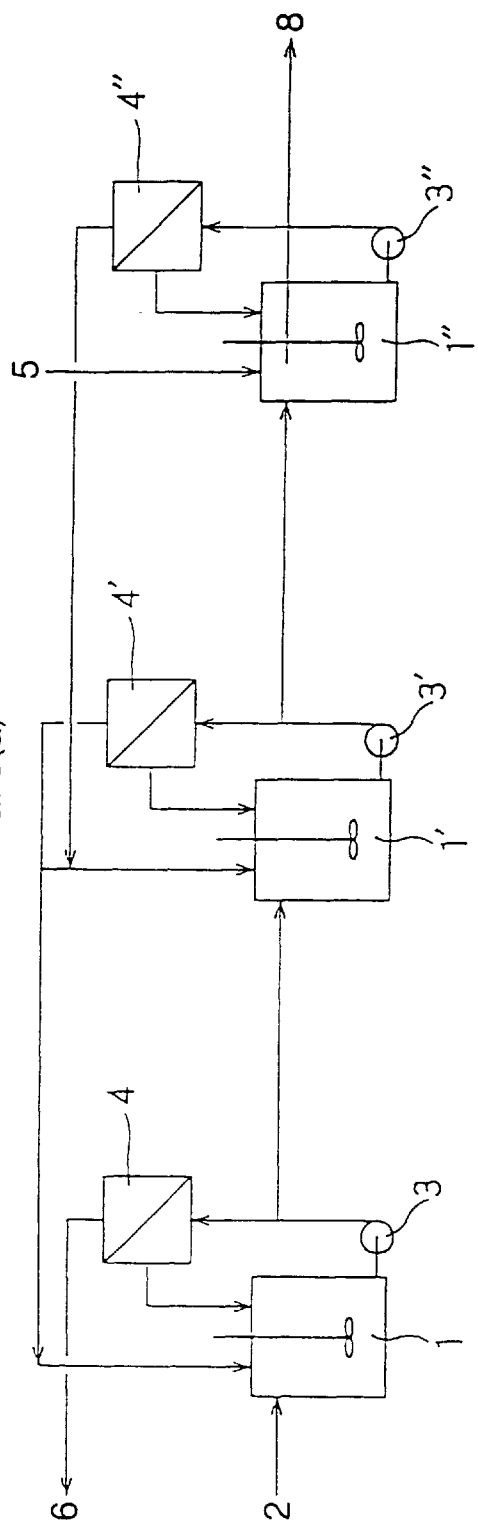
FIGS. 6(a) and 6(b) schematically illustrates a conventional multi-stage continuous counterflow system; wherein reference numerals and symbols are as follows.

For further comparison, 50 l of the same crude liquid was treated in a three-stage continuous counterflow system by using the apparatus shown in FIG. 6(a) equipped with the same ultrafiltration membrane as used in Example 1. The lysine recovery was 87.7% under the condition of R=1.5. The results obtained at a varied R value are shown in FIG. 3 with hollow triangle marks (Δ).

Figure 3:
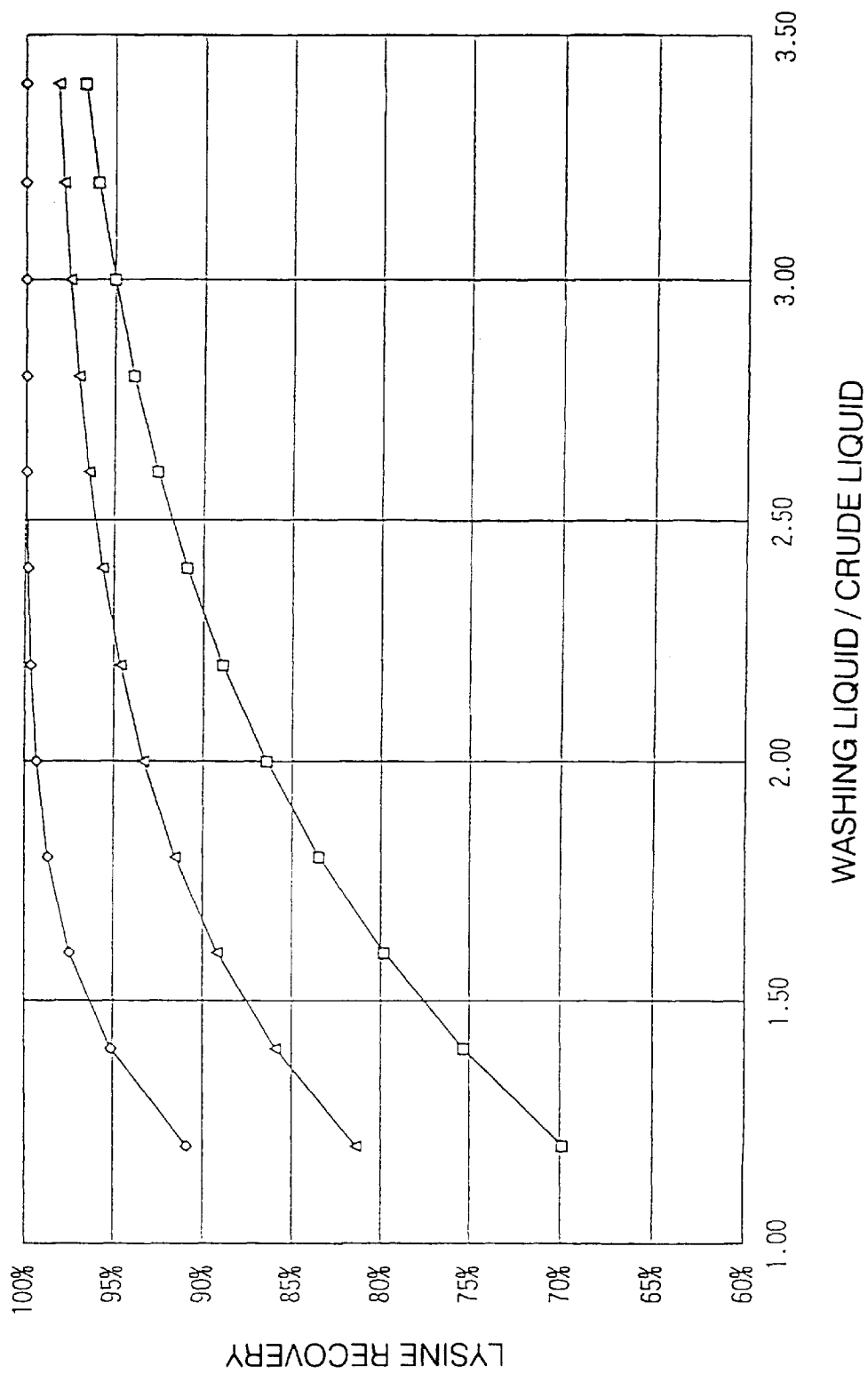
FIG. 3 is a graph of R value vs. lysine recovery.

FIG. 3 shows the results of Example 1 and Comparative Example 1. As is apparent from the Figure, the method according to the present invention attains a higher recovery of a valuable substance as compared with a single-stage semi-batch system and a three-stage continuous counterflow system that are typical conventional methods.

Additionally, the recovered liquid obtained in the present invention has a higher valuable substance concentration, and the amount of f resh washing water to be used can be reduced.

When the valuable substance is recovered from the resulting product liquid by removing water with steaming or the like in the post treatment, the steaming or the like can be saved owing to the high valuable substance concentration of the recovered product liquid, which will bring about a great economical advantage.

EXAMPLE 2

A mixed aqueous solution of dextran (molecular weight: 2,000,000) and sodium chloride (NaCl) was treated to remove sodium chloride as an impurity and recover dextran as a valuable substance. In this case, the objective component that should be transferred to the permeated liquid side by separation membrane treatment is sodium chloride, and dextran as a valuable substance is recovered in the concentrated liquid side.

Figure 2:
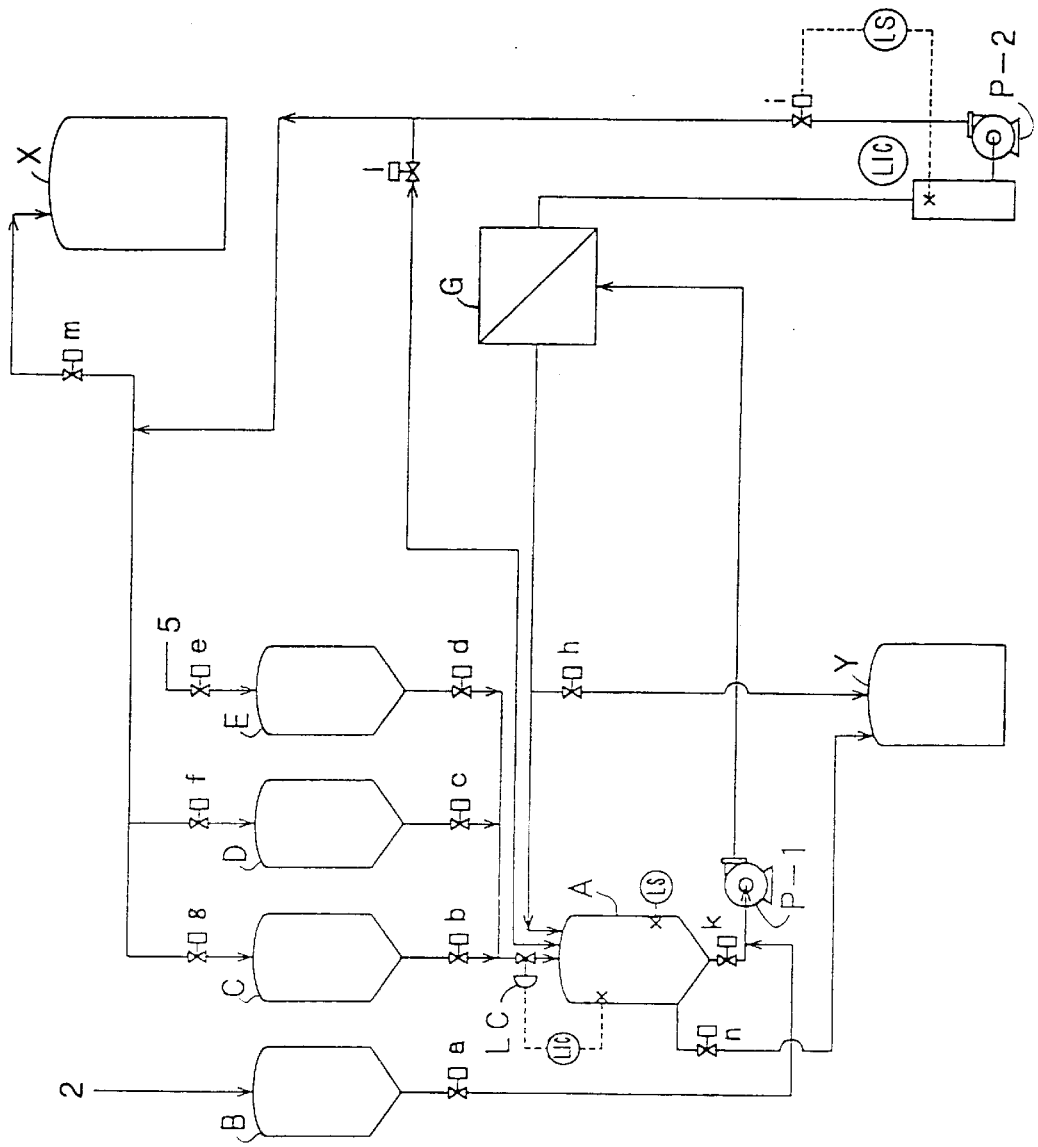
FIG. 2 schematically illustrates another example of the apparatus used in the present invention.

Using the apparatus of FIG. 2 which is basically the same as that used in Example 1, whose like reference letters designate the same component, in which the same ultrafiltration membrane as used in Example 1 was used, a mixed aqueous solution containing 2 mg/dl of dextran and 2 g/dl of NaCl was treated in accordance with the same procedure as for the amino acid recovery to remove NaCl. Water was used as a washing liquid.

A 5 l portion of the crude liquid (NaCl concentration: 2 g/dl) reserved in container B was transferred to container A (7-liter volume). With pump P-1 and liquid level control valve LC of container A operating, 6.65 l (1.33 times (R=1.33) as much as 5 l of the crude liquid) of a washing liquid containing NaCl at a medium concentration of 0.69 g/dl was slowly fed from container C to container A, and the mixture was introduced from container A into membrane separation unit G through pump P-1. The NaCl-containing liquid separated by the membrane treatment into the permeated liquid side was sent to a drainage tank X. The average NaCl concentration of the NaCl-containing permeated liquid was 1.42 g/dl.

The feed of the medium concentration washing liquid to container A was controlled by means of the liquid level control valve LC in such a manner that the amount being fed corresponded to the amount of the liquid passing through the membrane so that the volume of the liquid in container A might be kept constant (1st stage).

When the amount of the permeated liquid reached 6.65 l which was equal to the amount of the fed medium concentration washing liquid, and container C became empty, 6.65 l of a washing liquid having a low NaCl concentration of 0.26 g/dl was slowly fed from container D to container A. The liquid having passed through membrane separation unit G, which had an average NaCl concentration of 0.69 g/dl, was sent to container C for use as a medium concentration washing liquid in the subsequent washing cycle (2nd stage).

When the amount of the permeated liquid reached 6.65 l which corresponded to the amount of the fed low concentration washing liquid, and container D became empty, 6.65 l of washing water for final washing was slowly fed from container E to container A. The liquid having passed through membrane separation unit G had an average NaCl concentration of 0.26 g/dl. The liquid was sent to container D for use as a low concentration washing liquid in the next washing cycle (3rd stage).

After 6.65 l of water was fed, the residue containing dextran was forwarded to a recovered product tank Y. The product liquid thus recovered had an NaCl concentration of 0.12 g/dl.

The feed of the washing liquid or washing water to container A was controlled so as to correspond to the amount of the liquid passing through the membrane separation unit so that the amount of the liquid in container A was maintained constant throughout the above stages by means of a liquid level controller.

The above washing cycle was repeated 10 times for each batch to treat the whole amount of the crude liquid (50 l) under the condition of R=1.33. As a result, the removal of NaCl as an impurity from the crude dextran-containing liquid was 93.2%.

The total amount of fresh water used in each 3rd stage of 10 cycles was 66.5 l. The low concentration washing liquid and fresh water increased its NaCl concentration as they pass through the membrane and were reused as a medium concentration washing liquid and a low concentration washing liquid, respectively.

The same crude liquid was treated in the same manner as described above, except for varying the R value (washing water/crude liquid volume ratio). The results obtained are plotted with hollow lozenge marks ($\Diamond$) in FIG. 4, in which the abscissa indicates R=washing water/crude liquid, and the ordinate the percentage of impurity removal (%).

COMPARATIVE EXAMPLE 2

Figure 5B:
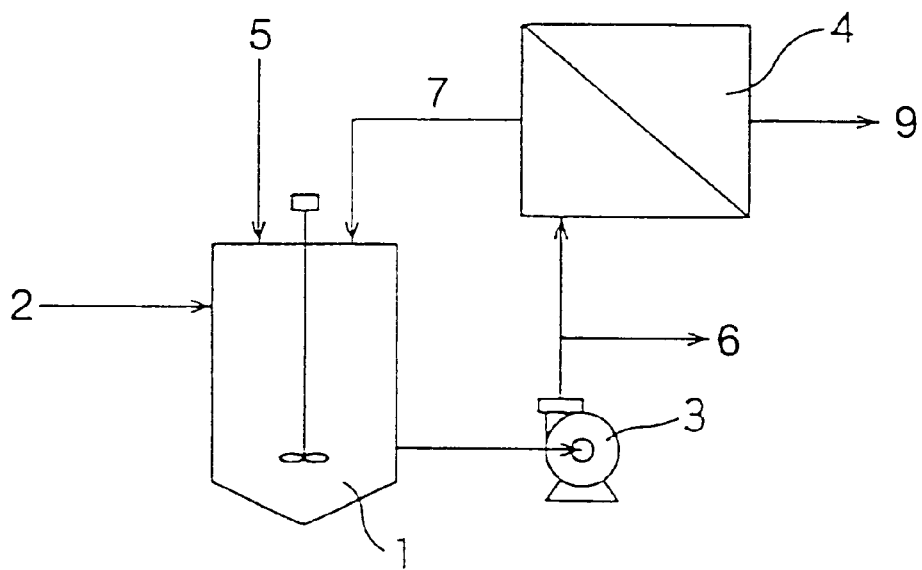

For comparison, 50 l of the same crude liquid as used in Example 2 (dextran-NaCl mixed aqueous solution) was treated in a single-stage semi-batch system by using the apparatus shown in FIG. 5(b). The same ultrafiltration membrane as used in Example 1 was used as a separation membrane.

The crude liquid 2 (50 l; dextran concentration: 2 mg/dl; NaCl concentration: 2 g/dl) was put in container 1 and treated under the condition of R=2. More specifically, twice as much washing water 5 as the crude liquid 2 (i.e., 100 l) was slowly fed to container 1 to recover a dextran-containing solution having a reduced impurity content. The recovered dextran-containing solution had an NaCl concentration of 0.27 g/dl, and the impurity removal from the crude liquid was 85.5%.

The same crude liquid was treated in the same manner, except for varying the R value (washing water/crude liquid volume ratio). The results obtained are plotted with hollow square marks ($\square$) in FIG. 4.

Figure 6B:
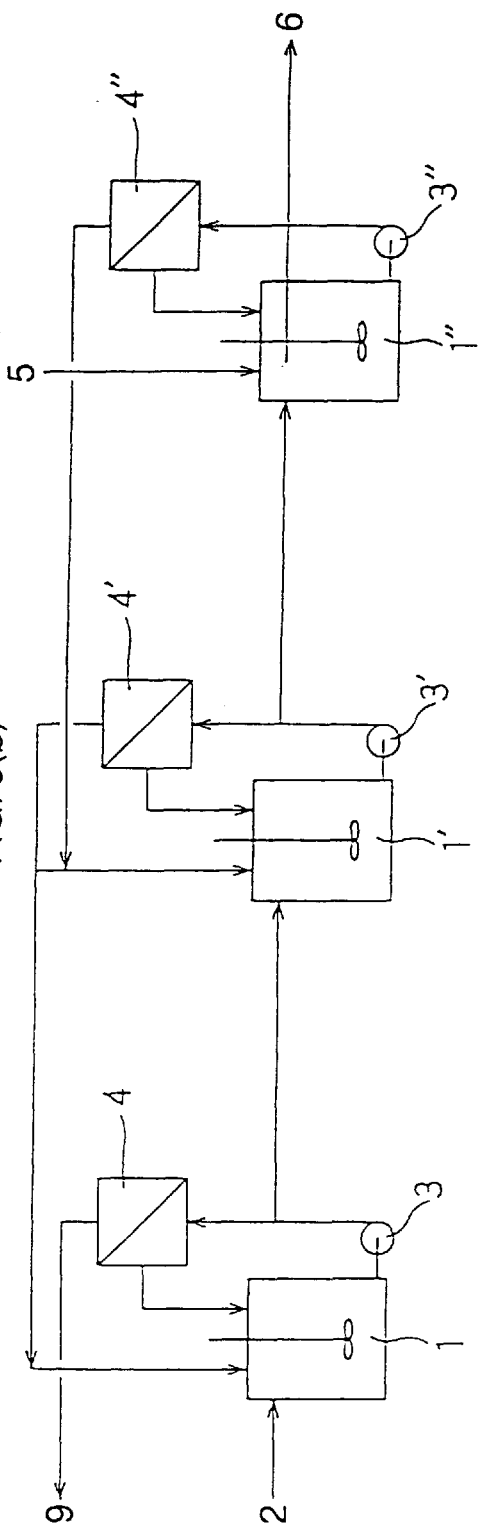

For further comparison, 50 l of the same crude liquid was treated in a three-stage continuous counterflow system by using the apparatus shown in FIG. 6(b) equipped with the same ultrafiltration membrane as used in Example 1. The NaCl removal was 87.2% under the condition of R=1.5. The results obtained at a varied R value are shown in FIG. 4 with hollow triangle marks ($\Delta$).

Figure 4:
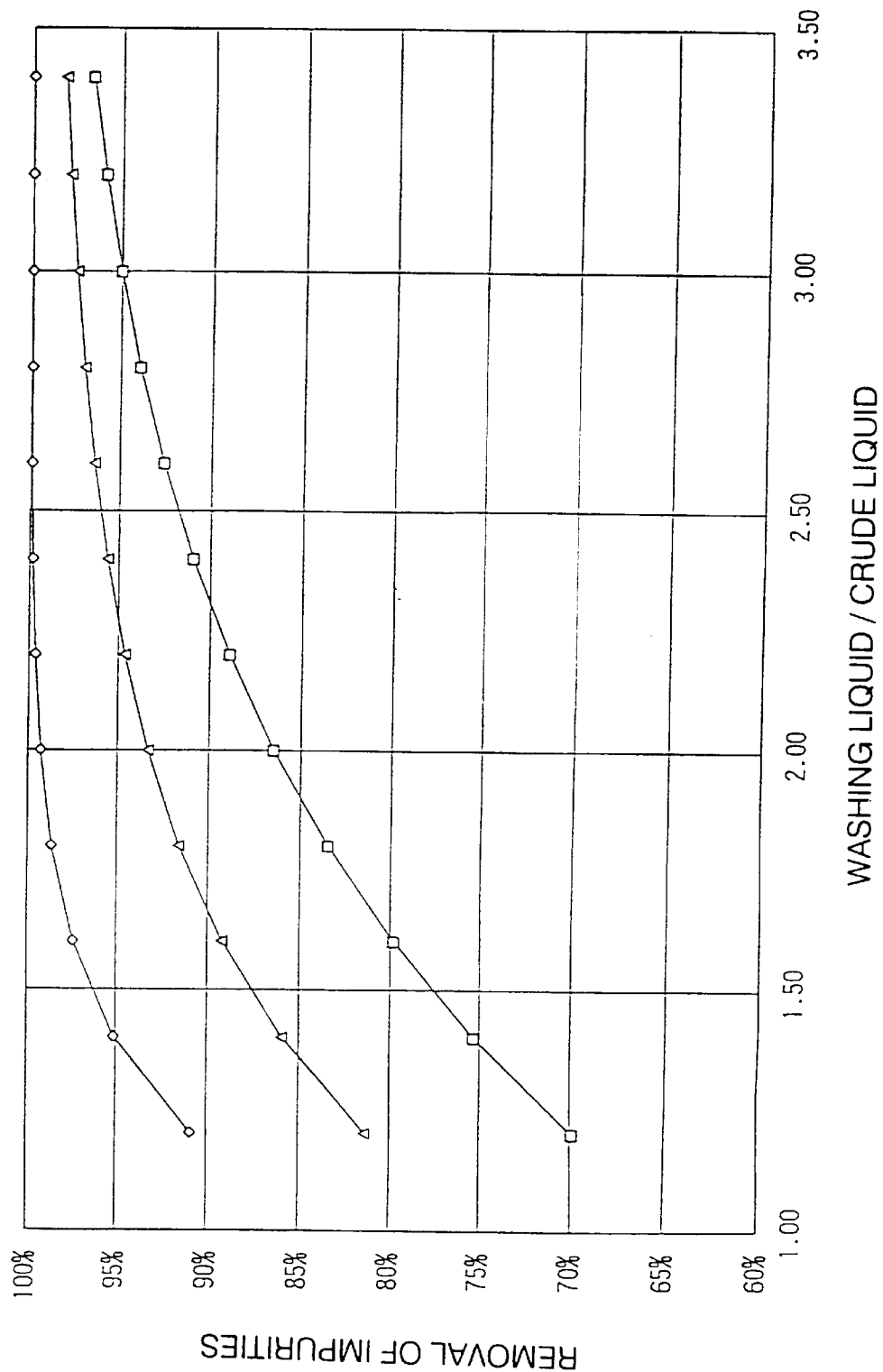
FIG. 4 is a graph of R value vs. impurity removal.

FIG. 4 shows the results of Example 2 and Comparative Example 2. As is apparent from the results, the method according to the present invention attains a higher impurity removal as compared with a single-stage semi-batch system and a three-stage continuous counterflow system that are typical conventional methods.

Additionally, the recovered product liquid obtained in the present invention has a higher valuable substance concentration, and the amount of fresh washing water to be used can be reduced.

While the invention has been described in detail and with reference to specific examples thereof, it will be apparent to one skilled in the art that various changes and modifications can be made therein without departing from the spirit and scope thereof.

This application is based on application No. Hei 8-311147 filed on Oct. 19, 1996, and an application claiming its domestic priority filed on Sep. 5, 1997 in Japan, the entire content of which is incorporated hereinto by reference.

What is claimed is:

1. A method for separating and recovering an objective component from a crude liquid by a membrane in time-lagged multi-stage washing operation, comprising:

at least two stages which comprise steps as follows:

a mixing step of mixing a washing liquid continuously or intermittently into a crude liquid stored in a container to form a mixture of said crude liquid and said washing liquid in each stage;

a separating step of separating said mixture in each stage into a permeated liquid and a residual liquid by passing said mixture through a membrane; and a returning step of returning said residual liquid to said container in each stage;

wherein said separating step, and returning step are performed simultaneously;

wherein successive ones of said at least two stages are separated by a time lag; and wherein successive ones of said at least two stages use washing liquids at different concentrations, in descending order, of the objective component concentration;

obtaining a first permeated liquid by the separating step in a first stage of said at least two stages of a cycle of the time-lagged multi-stage washing operation;

obtaining a final residual liquid by the separating step in a final stage of said at least two stages using a final washing liquid which has an objective component concentration of essentially zero; and using a permeated liquid obtained by a membrane treatment other than the first permeated liquid, as a washing liquid in a later cycle performed on another crude liquid;

wherein said later cycle has the same number of stages as in said cycle, and wherein said step of using a permeated liquid is carried out in a last stage of said later cycle.

2. The method according to claim 1, wherein the objective component to be separated from the crude liquid is a valuable substance.

3. The method according to claim 2, wherein said final washing liquid is water.

4. The method according to claim 2, wherein said objective component is an amino acid.

5. The method according to claim 1, wherein the crude liquid contains both the objective component and a valuable substance;

wherein the crude liquid subject to the method forms the final residual liquid containing a high concentration of the valuable substance; and wherein the valuable substance is a substance other than the objective component.

6. The method according to claim 5, wherein said final washing liquid is water.

7. The method according to claim 5, wherein said objective component is an inorganic salt, and wherein said valuable substance is a dye.

8. The method according to claim 1, wherein said final washing liquid is water.

9. The method according to claim 1, wherein said stages are two stages.

10. The method according to claim 1, wherein number of said stages is more than 2.

* * * * *